(12) United States Patent
Dally et al.

(10) Patent No.: US 10,361,023 B2
(45) Date of Patent: Jul. 23, 2019

(54) MAGNETIC POWER COUPLING TO AN INTEGRATED CIRCUIT MODULE

(71) Applicant: NVIDIA Corporation, Santa Clara, CA (US)

(72) Inventors: William J. Dally, Los Altos Hills, CA (US); Thomas Hastings Greer, III, Chapel Hill, NC (US); Sudhir Shrikantha Kudva, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 816 days.

(21) Appl. No.: 14/815,853

(22) Filed: Jul. 31, 2015

(65) Prior Publication Data
US 2016/0043569 A1    Feb. 11, 2016

Related U.S. Application Data

(60) Provisional application No. 62/034,725, filed on Aug. 7, 2014.

(51) Int. Cl.
| | |
|---|---|
| *H02J 5/00* | (2016.01) |
| *H01F 27/02* | (2006.01) |
| *H01F 27/24* | (2006.01) |
| *H01F 27/28* | (2006.01) |
| *H01F 38/14* | (2006.01) |
| *H02J 50/10* | (2016.01) |

(52) U.S. Cl.
CPC .......... *H01F 27/027* (2013.01); *H01F 27/24* (2013.01); *H01F 27/2823* (2013.01); *H01F 38/14* (2013.01); *H02J 5/00* (2013.01); *H02J 5/005* (2013.01); *H02J 50/10* (2016.02)

(58) Field of Classification Search
CPC .... H01F 27/027; H01F 27/24; H01F 27/2823; H02J 50/10
See application file for complete search history.

(56) References Cited

U.S. PATENT DOCUMENTS 6,285,569 B1    9/2001  Hall et al.
6,330,170 B1 *  12/2001  Wang ............... H02J 9/062
                                                   363/17

(Continued)

FOREIGN PATENT DOCUMENTS

EP    0740406 B1    8/2002

OTHER PUBLICATIONS

Office Action from Taiwanese Application No. 104125566, dated Jul. 12, 2016.

*Primary Examiner* — Jared Fureman
*Assistant Examiner* — Joel Barnett
(74) *Attorney, Agent, or Firm* — Leydig, Voit & Mayer, Ltd.

(57) ABSTRACT

A magnetic power supply coupling system is disclosed. An integrated circuit module includes an integrated circuit die and a secondary winding that is configured to generate an induced, alternating current based on a magnetic flux. A primary winding is external to the integrated circuit module, proximate to the integrated circuit module, and coupled to a main power supply corresponding to an alternating current that generates the magnetic flux. The induced, alternating current is converted into a direct current at a voltage level to supply power to the integrated circuit die.

19 Claims, 15 Drawing Sheets

(56) References Cited

U.S. PATENT DOCUMENTS

| | | | |
|---|---|---|---|
| 6,445,270 B1* | 9/2002 | Ogasawara | H01F 38/14 336/182 |
| 6,597,593 B1 | 7/2003 | Cruz et al. | |
| 7,333,349 B2 | 2/2008 | Chang et al. | |
| 8,107,263 B2* | 1/2012 | Ueno | H02M 3/335 363/21.02 |
| 9,755,534 B2* | 9/2017 | Mao | H02M 3/3376 |
| 2003/0137383 A1* | 7/2003 | Yang | H01F 17/0013 336/200 |
| 2005/0180175 A1* | 8/2005 | Torrey | H02M 3/335 363/17 |
| 2010/0165669 A1* | 7/2010 | Li | H02M 1/34 363/21.04 |
| 2010/0232181 A1* | 9/2010 | Nakahori | H01F 27/2804 363/17 |
| 2011/0080756 A1* | 4/2011 | Kern | H02M 3/33507 363/17 |
| 2012/0120697 A1* | 5/2012 | Cuk | H02M 1/4216 363/126 |
| 2012/0262967 A1* | 10/2012 | Cuk | H02M 7/4807 363/131 |
| 2012/0280776 A1* | 11/2012 | Hashimoto | H01F 17/04 336/83 |
| 2014/0133186 A1* | 5/2014 | Balakrishnan | H02M 3/33523 363/17 |
| 2014/0192560 A1* | 7/2014 | Ou | H02M 1/40 363/16 |
| 2014/0225439 A1* | 8/2014 | Mao | H02M 3/3376 307/31 |
| 2014/0266546 A1* | 9/2014 | Mao | H01F 27/2804 336/200 |
| 2015/0332838 A1* | 11/2015 | Blanke | H01F 27/2804 336/170 |

* cited by examiner

MAGNETIC POWER COUPLING TO AN INTEGRATED CIRCUIT MODULE

CLAIM OF PRIORITY

This application claims the benefit of U.S. Provisional Application No. 62/034,725 titled "MAGNETIC POWER COUPLING TO A PROCESSOR MODULE," filed Aug. 7, 2014, the entire contents of which is incorporated herein by reference.

FIELD OF THE INVENTION

The present invention relates to integrated circuits, and more particularly to techniques for supplying power to integrated circuits.

BACKGROUND

Conventional processors such as central processing units (CPUs) and graphics processing units (GPUs) require a high current, low-voltage power supply. A typical processor may require a power supply that provides a current as high as 150 amperes (A) and a voltage of less than 1 volt (V). Bringing a high-current low-voltage power supply onto a package or module that encloses the processor integrated circuit electrically creates a number of issues including a voltage drop (i.e., IR drop) in the wire (e.g., trace fabricated on a printed circuit board) that electrically couples a switching voltage regulator to the module and high supply impedance resulting from inductance of a power distribution network that routes power from the module to the integrated circuit die.

In a data center, processor power typically originates with 480 VAC (volt alternating current) three-phase power that is stepped down to 240 VAC or 120 VAC, and then stepped down via a switching voltage regulator to 12 VDC before being stepped down by a second switching voltage regulator to the processor supply voltage (e.g., 3.3 VDC, etc.). The three-stage step-down process results in significant losses. However, directly converting from a high voltage power supply (e.g., 480 VAC, 240 VAC, or 120 VAC) is problematic because of insulation, isolation, and creep requirements associated with handling high-voltage conductors. Thus, there is a need for addressing these issues and/or other issues associated with the prior art.

SUMMARY

A magnetic power supply coupling system is disclosed. An integrated circuit module includes an integrated circuit die and a secondary winding that is configured to generate an induced, alternating current in response to an alternating magnetic flux. A primary winding is external to the integrated circuit module, proximate to the integrated circuit module, and coupled to a main power supply corresponding to an alternating current that generates the magnetic flux. The induced, alternating current is converted into a direct current at a voltage level to supply power to the integrated circuit die.

DETAILED DESCRIPTION

The problems of low-voltage high-current electrical distribution associated with conventional processor power supplies and of handling high-voltage signals required for direct conversion can be alleviated by magnetically coupling power to an integrated circuit module. In the context of the following description, the integrated circuit module is package enclosing an integrated circuit die and at least a portion of a transformer. An alternating current is applied to a primary winding of the transformer in order to induce a changing magnetic field proximate to a secondary winding of the transformer that is included in the integrated circuit module. The changing magnetic flux induces an alternating current in the secondary winding and the alternating current is converted to a DC (direct current) voltage via a rectifier and stepped down, if needed, to a supply voltage of the integrated circuit die.

Figure 1A:
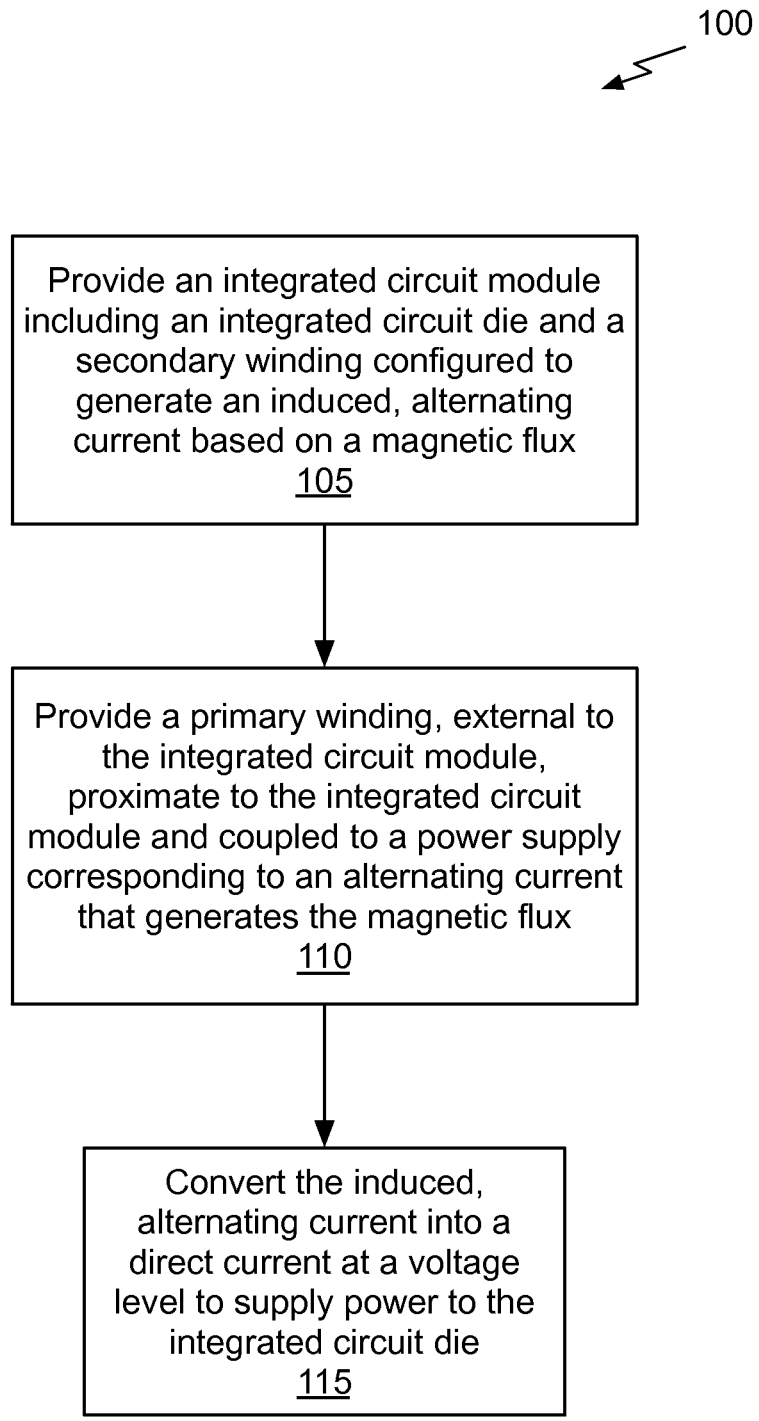
FIG. 1A illustrates a flowchart of a method 100 for providing power to an integrated circuit, in accordance with one embodiment.

FIG. 1A illustrates a flowchart of a method 100 for providing power to an integrated circuit, in accordance with one embodiment. Although method 100 is described in conjunction with the systems of FIGS. 1B, 2A-2F, 3A-3D, 4A-4E, and 5, persons of ordinary skill in the art will understand that any system that performs method 100 is within the scope of embodiments of the present invention.

In one embodiment, a magnetic power supply coupling system is configured to perform method 100. The magnetic power supply coupling system may be electrically coupled to an integrated circuit die to provide power to the integrated circuit die. At step 105, an integrated circuit module is provided that includes an integrated circuit die and a secondary winding that is configured to generate an induced, alternating current based on a magnetic flux.

At step 110, a primary winding that is external to the integrated circuit module, proximate to the integrated circuit module, and coupled to a main power supply corresponding to an alternating current that generates the magnetic flux. The magnetic flux is generated in the magnetic core of the primary winding and the secondary winding. While the windings of transformers by themselves are inductors, in the context of the following description the windings are referenced in their capacity as a component of a transformer (i.e., an isolated winding on a core) and not as inductors. The main power supply corresponds to a first voltage level and a first current and may be a high-voltage low-current power supply. In one embodiment, the first voltage level is a high voltage level and the first current is a small current. The power is the product of the first current and the first voltage. A first portion of the magnetic core is a component of a primary inductor and is separate from the integrated circuit module. A second portion of the magnetic core is a component of a secondary inductor is and included in the integrated circuit module.

In one embodiment, the first portion of the magnetic core is a primary core that is formed by a C-shaped piece of magnetic material (e.g., ferrite) with a primary winding wrapped around at least a portion of the primary core. In the context of the following description the first current is an alternating current (AC) that flows through the primary winding, generating the magnetic flux and the magnetic flux varies in response to the alternating current. In a one embodiment, the AC current is a square wave with a frequency of between 100 kHz and 1 MHz. In the context of the following description, the primary core and primary winding form the primary inductor. The primary inductor may function as a high-voltage primary of a transformer that includes the magnetic core.

In one embodiment, the second portion of the magnetic core is a secondary core that is formed by another C-shaped piece of magnetic material with a secondary winding wrapped around at least a portion of the secondary core. In one embodiment, opposing ends of the primary core are physically coupled to opposing ends of the secondary core. In the context of the following description, the secondary core and secondary winding form the secondary inductor. The secondary inductor may function as a low-voltage secondary of the transformer that includes the magnetic core.

At step 115, the induced, alternating current is converted into a direct current at a second voltage level to supply power to the integrated circuit die. The alternating current is induced in the secondary winding by the varying magnetic flux and the induced current is converted into a second current to supply power to the integrated circuit die. An AC voltage induced in the secondary winding by the magnetic flux is converted into a DC voltage at the second voltage level to supply power to the integrated circuit die. In one embodiment, the second voltage level that supplies power to the integrated circuit die is lower than a DC voltage level that corresponds to the main power supply. In one embodiment, the induced current and the second current that supplies power to the integrated circuit die are both greater than the first current that corresponds to the main power supply.

The second voltage and second current correspond to a power supplied to the integrated circuit and may be a low-voltage high-current power supply. In one embodiment, the second voltage level is a supply voltage for the integrated circuit, such as $V_{dd}$. In one embodiment, a rectifier circuit is configured to receive the induced current and the induced voltage and generate the second current and the second voltage level. In one embodiment, the rectifier circuit is included in the package and coupled to the integrated circuit die through a filter circuit. In one embodiment, the rectifier circuit is a "synchronous rectifier" implemented with MOSFETs.

More illustrative information will now be set forth regarding optional functionality/architectures of different embodiments that may or may not be implemented in the context of the previous embodiment, per the desires of the user. It should be strongly noted that the following information is set forth for illustrative purposes and should not be construed as limiting in any manner. For example, any of the following features may be optionally incorporated with or without the other features described.

Figure 1B:
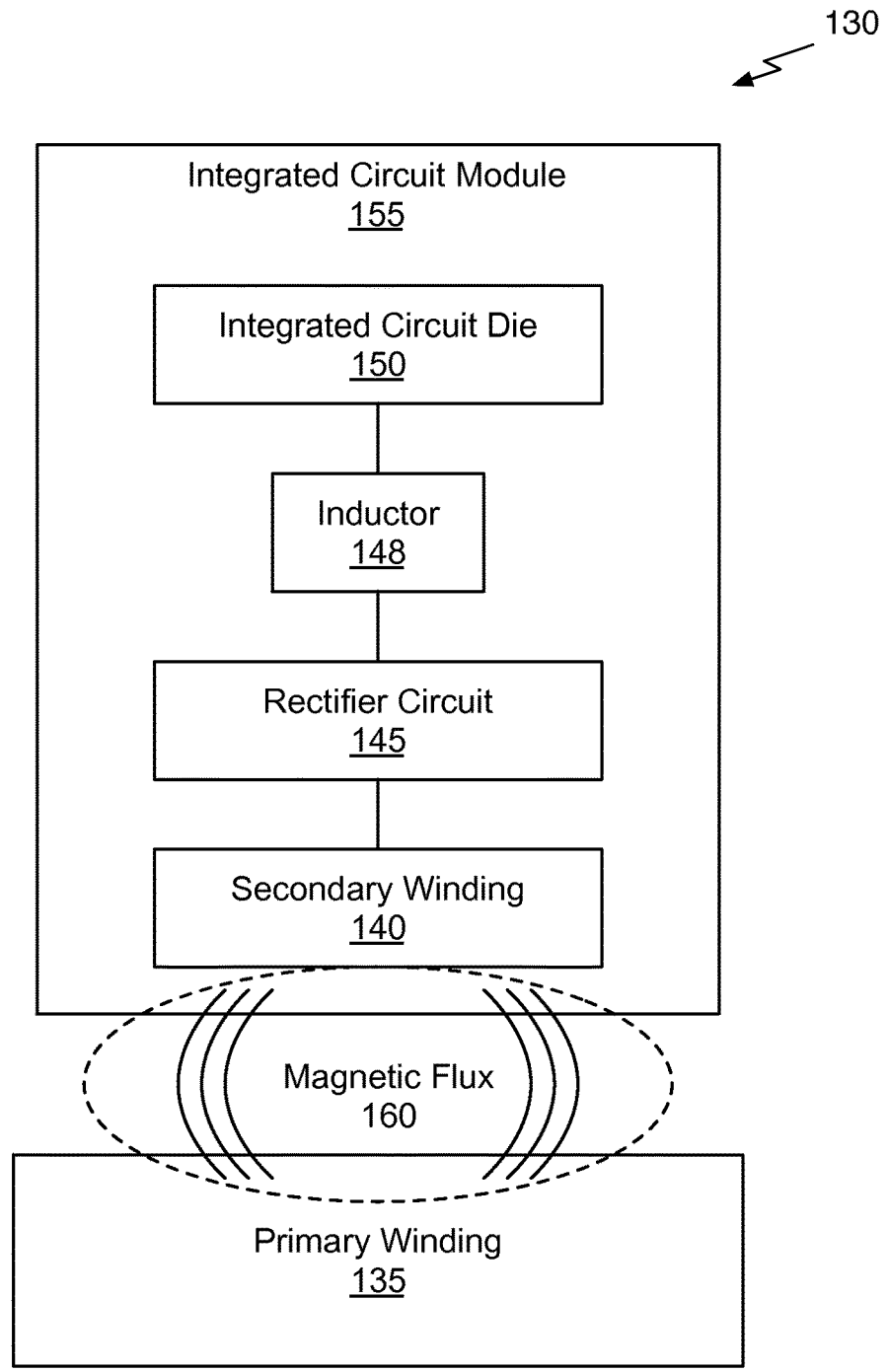
FIG. 1B illustrates a magnetic power supply coupling system, in accordance with one embodiment.

FIG. 1B illustrates a magnetic power supply coupling system 130, in accordance with one embodiment. The magnetic power supply coupling system 130 includes a primary winding 135 and an integrated circuit module 155 that is magnetically coupled to the primary winding 135 through a magnetic circuit. Magnetic flux 160 produced by the primary winding 135 flows through the magnetic circuit. In one embodiment, the primary winding 135 is replaced with a primary inductor including a primary winding and the first portion of the magnetic core that is a piece of magnetic material that forms a primary core.

The integrated circuit module 155 includes a secondary winding 140, a rectifier circuit 145, an inductor 148, and an integrated circuit die 150. In one embodiment, the secondary winding 140 is replaced with a secondary inductor including a secondary winding and the second portion of the magnetic core that is a piece of magnetic material that forms a secondary core. In one embodiment, at least a portion of the secondary core is wrapped with the secondary winding 140 to form a low-voltage secondary winding of a transformer.

The rectifier circuit 145 is electrically coupled to the secondary winding 140 and may be entirely or partially integrated into the integrated circuit die 150. The integrated circuit die 150 may be mounted on a package substrate and enclosed in a device package that also includes one or more of the rectifier circuit 145, the inductor 148, and at least a portion of the secondary winding 140 to produce the integrated circuit module 155. In one embodiment, the secondary winding 140 and at least a portion of the secondary core is included within the integrated circuit module. A remaining portion of the secondary core (i.e., the opposing ends) may protrude outside of the device package of the integrated circuit module 165.

The rectifier circuit 145 is configured to convert current and voltage induced in the secondary winding 140 into a second current and second voltage level that are provided to the integrated circuit die 150. The device package may be electrically coupled to a PCB. In one embodiment, the inductor 148 may be omitted.

Figure 2A:
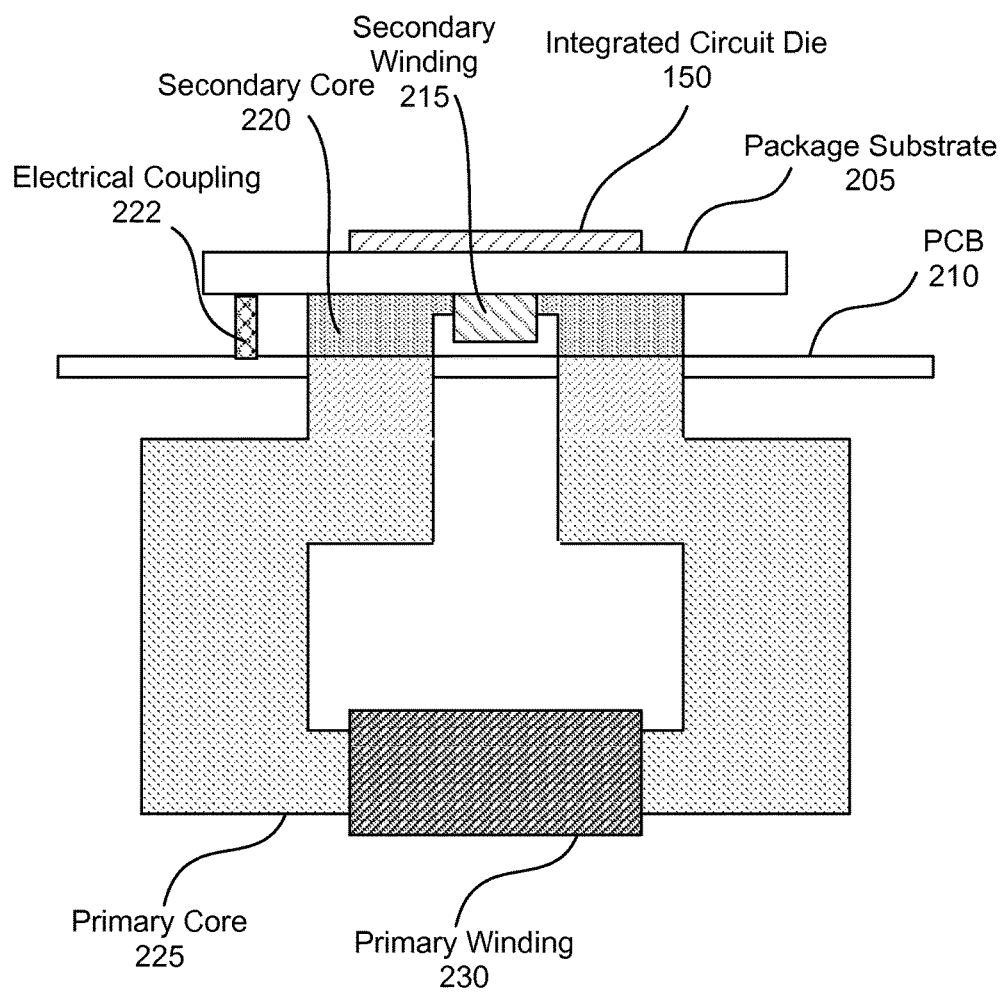
FIGS. 2A, 2B, and 2C illustrate cross-section views of the magnetic power supply coupling system of FIG. 1B, in accordance with one embodiment.

FIG. 2A illustrates a cross-section view of the magnetic power supply coupling system 130 of FIG. 1B, in accordance with one embodiment. A secondary core 220 and a secondary winding 215 function as a low-voltage secondary winding of a transformer. The integrated circuit module 155 shown in FIG. 1B includes the integrated circuit die 150 and may also include a package substrate 205, the secondary core 220, and the secondary winding 215. In one embodiment, the second portion of the magnetic core of the transformer is integrated into the integrated circuit module 155 by bonding a U or C-shaped piece of magnetic material to the back of the package substrate 205 as the secondary core 220. A piece of copper tape may run over the U or C-shaped piece of magnetic material to provide the secondary winding 215 for the secondary inductor. The secondary winding 215 is electrically coupled to the package substrate 205 at opposing ends of the copper tape to provide a current and voltage to the integrated circuit module 155. The current and voltage are induced in the secondary winding 215 by the magnetic flux. A magnetic circuit is completed by a primary core 225 and a primary winding 230 that function as a high-voltage primary inductor of the transformer to generate the magnetic flux.

In one embodiment, the primary core 225 is a U or C-shaped piece of magnetic material that penetrates a PCB 210 under the package substrate 205. In one embodiment, the PCB 210 is a low-voltage PCB. In one embodiment, the primary core 225 is formed from two L-shaped pieces of magnetic material to facilitate mounting a bobbin around the primary core 225. In other embodiments, the shape of the magnetic core formed by the primary core 225 and secondary core 220 may be different than the "pear" shape shown in FIG. 2A. For example, the shape of the magnetic core may be a rectangle, oval, or any other closed loop shape. A circumference of the primary core 225 and/or secondary core 220 may vary along the length of the respective core. For example, the circumference of the secondary core 220 may be smaller near the secondary winding 215. Similarly, the circumference of the primary core 225 may increase as the distance from the opposing ends that pass through the PCB 210 increases. A reluctance of the magnetic core decreases as the cross-sectional area of the core increases, reluctance $R=1/\mu A$, where 1 is the length of the circuit, $\mu$ is the permeability of the material, and A is the cross-sectional area.

The integrated circuit module 155 may be electrically coupled to the PCB 210 by conventional means, shown as an electrical coupling 222. Example electrical coupling mechanisms include solder balls, a connector, socket, or the like, that may connect the package substrate 205 to the PCB 210 to connect signals between the two. The primary core 225 is configured to pass through one or more openings in the PCB 210 and is physically coupled to the secondary core 220. In one embodiment, the primary core 225 is held via mechanical springs or clamps against the secondary core 220 to physically couple the primary core 225 to the secondary core 220 and form the magnetic circuit. In one embodiment, the primary core 225 is physically coupled to the secondary core 220 using solder or glue. In one embodiment, high-voltage signals are associated with the primary winding 230 and low-voltage signals are associated with the secondary winding 215.

In one embodiment, no high-voltage signals are carried by either the PCB 210 or the integrated circuit module 155. In fact, in one embodiment, there are no electrical power connections from the PCB 210 to the integrated circuit module 155, instead power is magnetically provided to the integrated circuit module 155 by the flux passing through the magnetic circuit which induces current and voltage in the secondary winding.

The magnetic power supply coupling system 130 may completely eliminate all voltage drops (i.e., IR losses) associated with distributing power between the primary inductor and the integrated circuit module 155. The second voltage level and the second current provide a low-voltage high-current direct current (DC) power that is produced directly on the integrated circuit module 155 by the rectifier circuit 145. Therefore, in one embodiment, transporting the low voltage supply to the integrated circuit module 155 is unnecessary and there are no voltage drops from distribution of the low voltage supply. Compared with a conventional implementation that converts an AC high-voltage low-current power supply to a DC low-voltage high-current power supply (i.e., an isolated high-step-down converter) for use by the integrated circuit die 150, the number of magnetic components may be reduced because only a single stage is needed for the conversion instead of three stages.

Figure 2B:
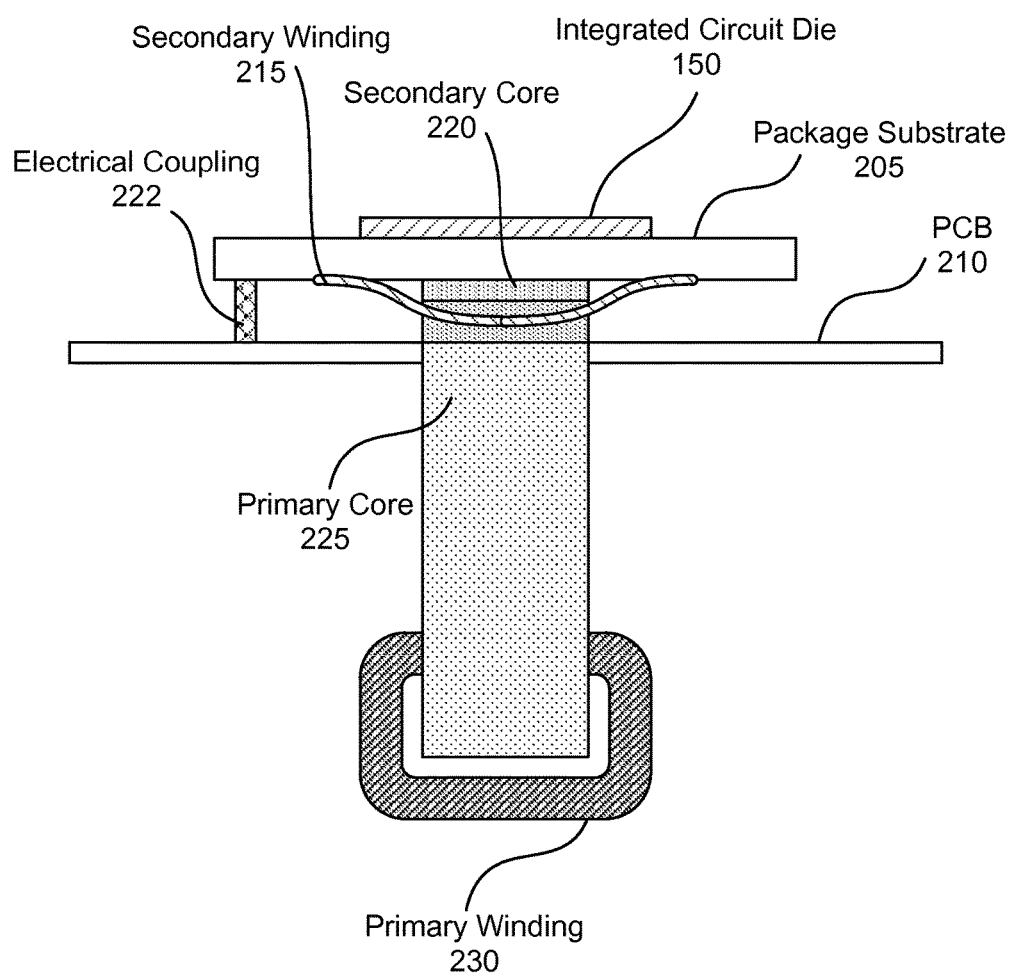

FIG. 2B illustrates another cross-section view of the magnetic power supply coupling system 130 of FIG. 1B, in accordance with one embodiment. The cross-section view shown in FIG. 2B is rotated 90 degrees around a vertical axis compared with the cross-section view shown in FIG. 1A. As shown in FIG. 2B, a U or C-shaped piece of magnetic material is coupled to the back of the package substrate 205 to form the secondary core 220 and a piece of copper tape is positioned over the U or C-shaped piece of magnetic material. The copper tape forms the secondary winding 215 and is electrically connected to the package substrate 205 at opposing ends of the copper tape to provide the induced current and voltage to the integrated circuit module 155. The current and voltage are induced in the secondary winding 215 by the magnetic flux that is generated in the magnetic core. The magnetic circuit is completed by the primary core 225. The primary winding 230 is wound on the primary core and functions as a high-voltage primary winding of the transformer.

Figure 2C:
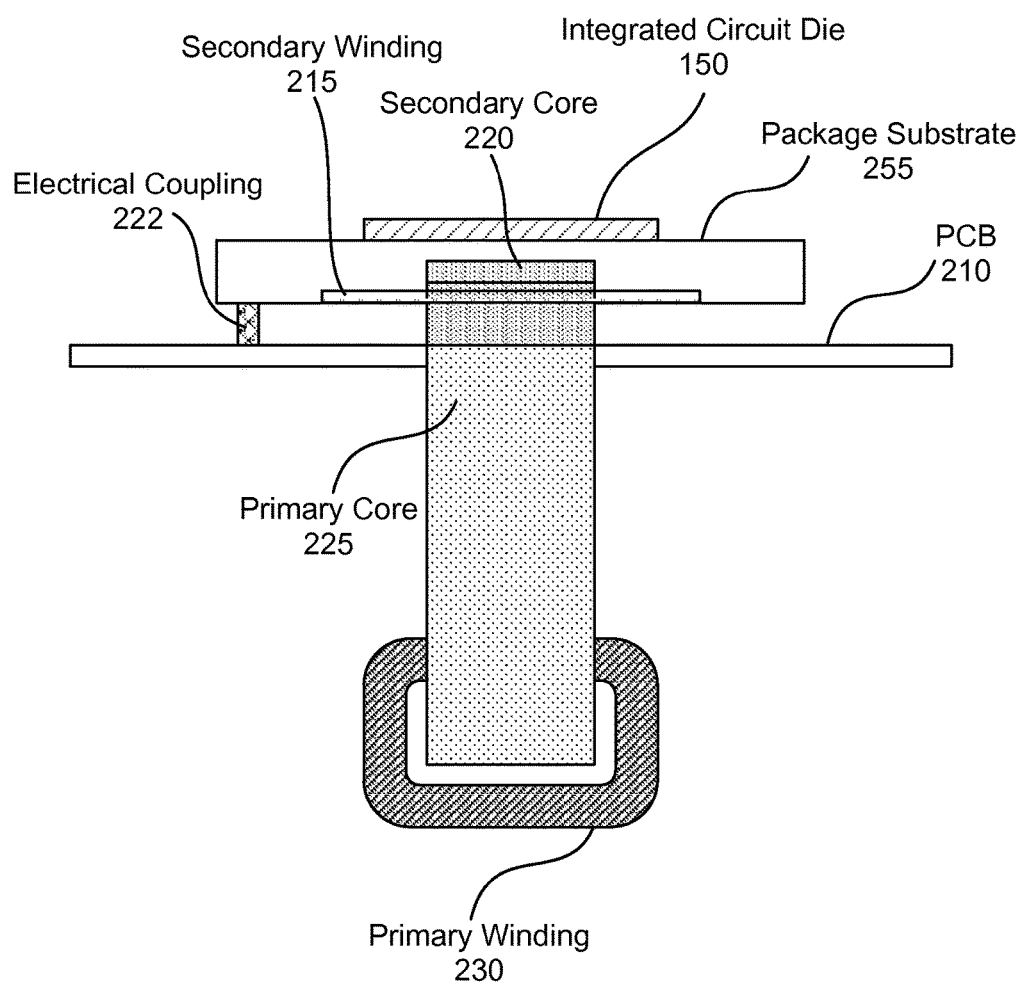

FIG. 2C illustrates another cross-section view of the magnetic power supply coupling system 130 of FIG. 1B, in accordance with one embodiment. As shown in FIG. 2C, the U or C-shaped piece of magnetic material is coupled to the back of the package substrate 205 that forms the secondary core 220, and the piece of copper tape that is positioned over the U or C-shaped piece of magnetic material is at least partially recessed into a package substrate 255. Opposing ends of the secondary core 225 that are physically coupled to the primary core 225 may protrude from a device package that encloses the integrated circuit module 155. The integrated circuit module 155 may include the integrated circuit die 150, the package substrate 255, the secondary winding 215, and at least a portion of the secondary core 220.

The transformer formed by the primary core 225 and primary winding 230 and the secondary core 220 and the secondary winding 215 may be used in an inverter circuit configuration that is electrically coupled to the primary winding 230, as further described in conjunction with FIGS. 3A-3D. The winding ratio between the primary winding 230 and the secondary winding 215 is chosen so that when the voltage at the primary winding 135 is a high-voltage level associated with a main power supply (e.g., 120 VAC, 240 VAC, 480 VAC) the induced voltage is a low-voltage level (e.g., 2 VAC etc.) that may be more easily converted to a DC voltage level by the rectifier circuit 145. In one embodiment, the main power supply frequency is 500 KHz. When the AC voltage is applied across the primary winding 230, the alternating current flows through the primary winding 230 and a low voltage level (e.g., nominally 2 VAC) is induced across the secondary winding 215. With a single turn on the secondary winding 215 of the secondary inductor (as shown in FIGS. 2A, 2B, and 2C) the number of turns required in the primary winding 230 is 60, 120, or 240 (for 120 VAC, 240 VAC, or 480 VAC with a 1.4× peak voltage, respectively). Compared with the number of turns used with a full-bridge inverter circuit, the number of turns is halved for a half-bridge inverter circuit configuration. In one embodiment, a second piece of copper tape is passed over an additional piece of magnetic material to form a storage inductor L1, such as the storage inductor 148 shown in FIG. 1B.

Figure 2D:
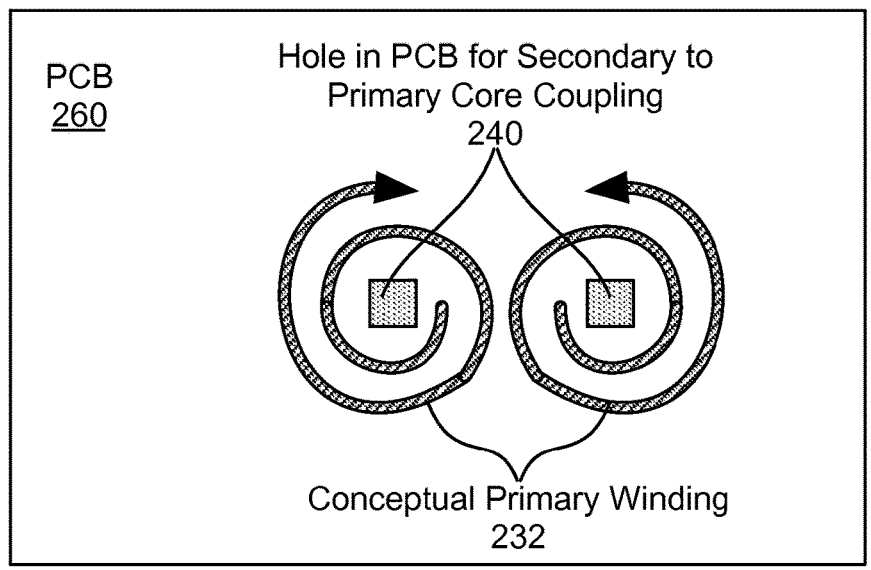
FIGS. 2D and 2E illustrate the PCB of FIGS. 2A, 2B, and 2C, in accordance with one embodiment.

FIG. 2D illustrates a PCB 260 that may be used in place of the PCB 210 of FIGS. 2A, 2B, and 2C, in accordance with one embodiment. Two holes 240 for physically coupling the secondary core 220 to the primary core 225 pass through the PCB 260. A primary winding 235 is implemented as conductive traces on the PCB 260 that each spiral around a hole 240 in opposing directions (e.g., clockwise and counterclockwise) as shown by the conceptual primary winding 232. The conductive traces provide an electrical connection through which the first current flows.

Figure 2E:
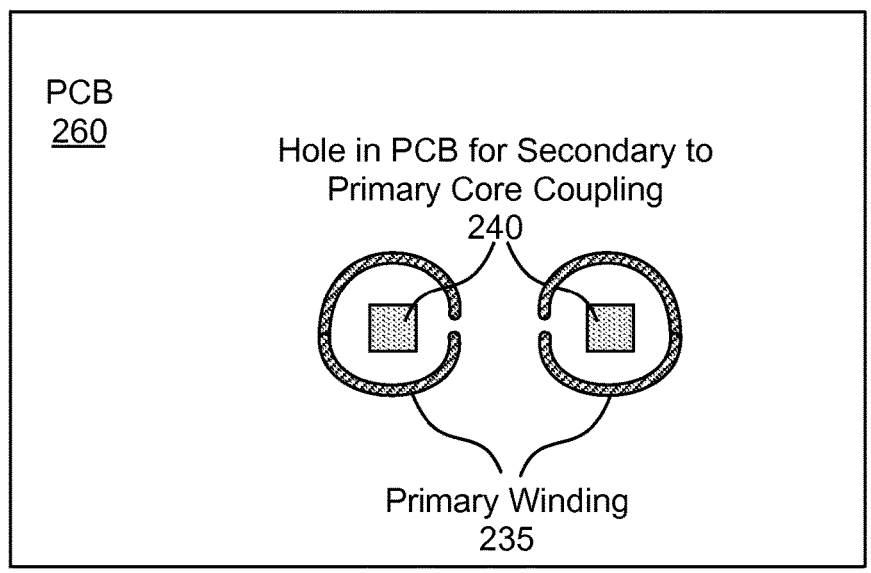

FIG. 2E illustrates the PCB 260 of FIG. 2D, in accordance with one embodiment. The traces on the PCB 260 that form the primary winding 235 appear as circles instead of spirals. The gap in each circle is where the trace is routed through to the next deeper layer of the PCB 260. The number of layers in the PCB 260 may limit the number of turns in the primary winding 230 assuming that each turn occupies a separate layer of the PCB 260.

Figure 2F:
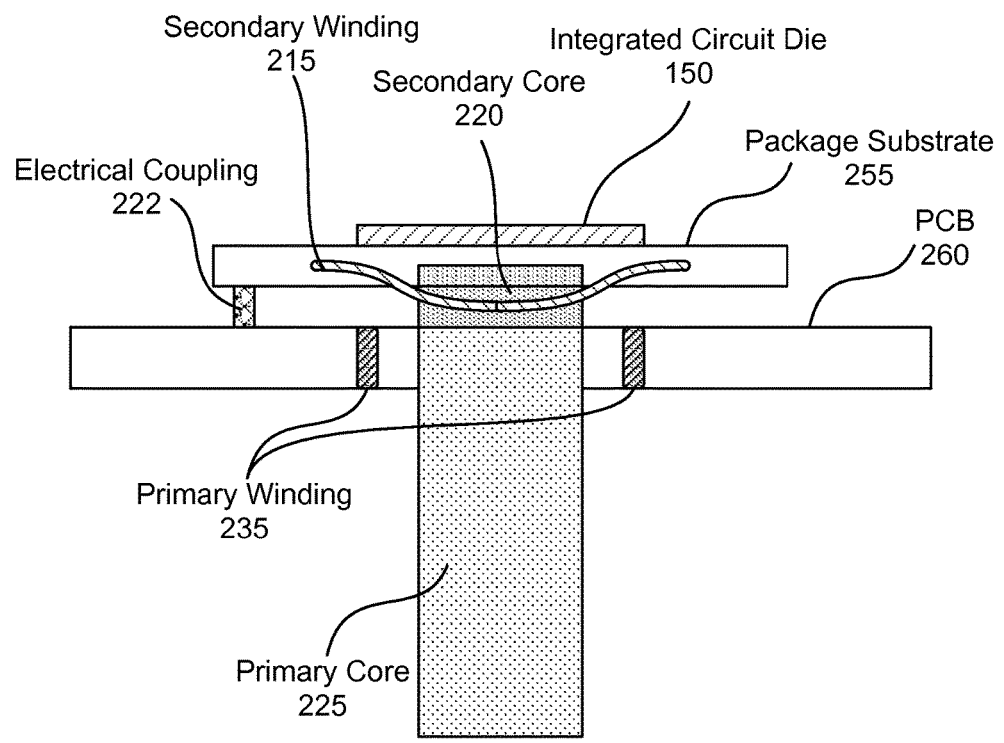
FIG. 2F illustrates a cross-section view of the magnetic power supply coupling system of FIG. 1B with a primary winding implemented in the PCB, in accordance with one embodiment.

FIG. 2F illustrates a cross-section view of the magnetic power supply coupling system 130 of FIG. 1B with a primary winding 235 implemented in the PCB 260, in accordance with one embodiment. The turns of the primary winding 235 are traces in the PCB 260. As shown in FIG. 2F, the U or C-shaped piece of magnetic material forming the secondary core 220 is at least partially recessed into the package substrate 255 and the piece of copper tape that is positioned over the U or C-shaped piece of magnetic material is also at least partially recessed into a package substrate 255. Similarly, the primary winding 235 is recessed into the PCB 260.

Figure 3A:
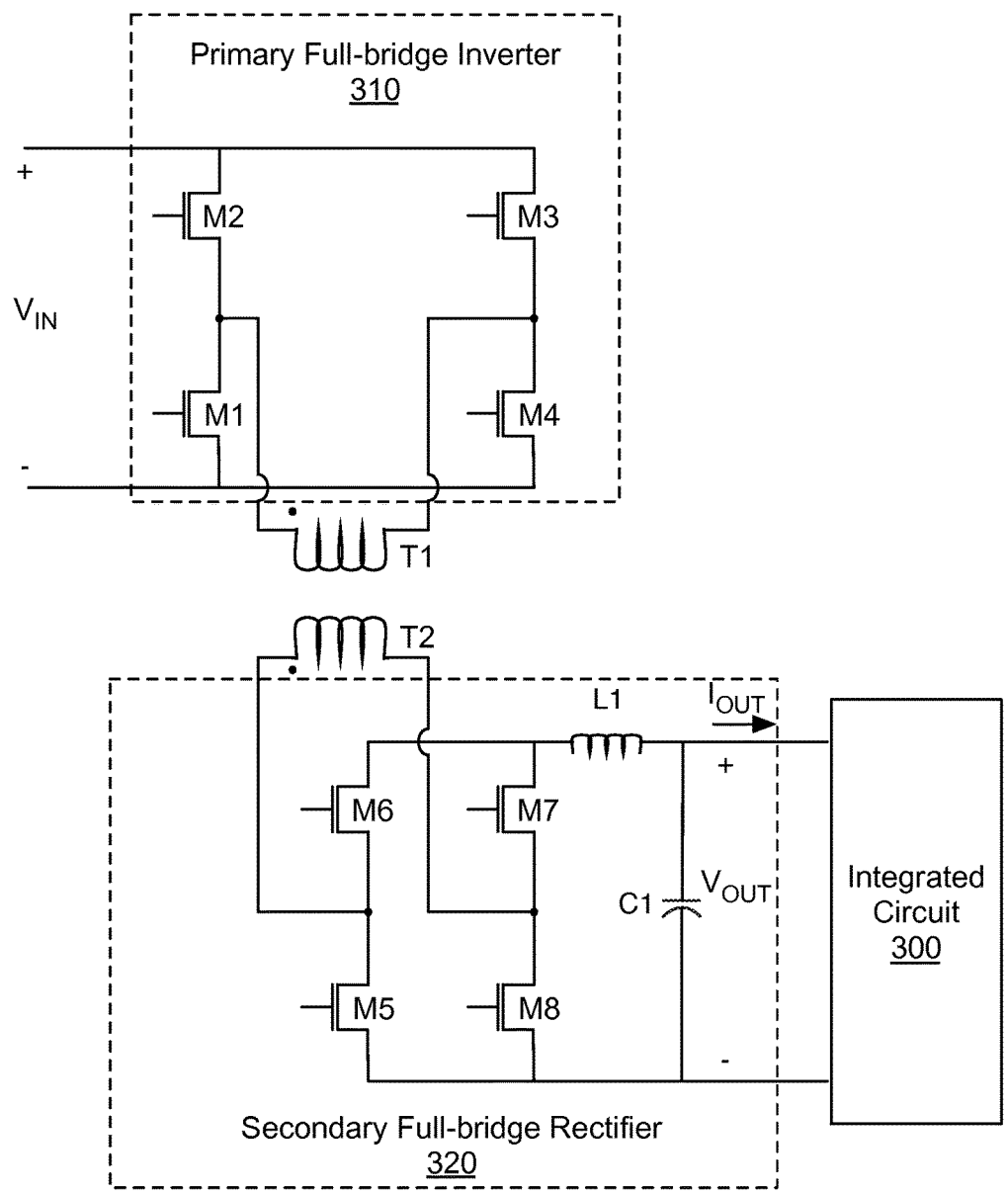
FIG. 3A illustrates a primary full-bridge inverter and secondary full-bridge rectifier configured as a magnetic power supply coupling system, in accordance with one embodiment.

FIG. 3A illustrates one phase of a primary full-bridge inverter 310 and secondary full-bridge rectifier 320 that are configured as a magnetic power supply coupling system, in accordance with one embodiment. The secondary full-bridge rectifier 320 may be implemented as the rectifier circuit 145 shown in FIG. 1B. The integrated circuit 300 is implemented as the integrated circuit die 150 shown in FIG. 1B. In one embodiment, the integrated circuit 300 is a processor circuit. In one embodiment, L1 is the storage inductor 148 shown in FIG. 1B.

Two primary full-bridge inverters 310 may be included in the magnetic flux source 135 shown in FIG. 1B where each primary full-bridge inverter 310 is one of two synchronized phases used to produce the alternating current and the voltage at the primary winding 135. The amount of current that can be provided by each of the two phases is limited, so each phase provides half the current and half of the power. Each phase includes a dedicated transformer. In one embodiment, each of the two phases receives a 480 VAC 155 mA input corresponding to the main power supply and produces a 1 VDC 75 A output corresponding to the power supply for the integrated circuit die 150. In one embodiment, a 3-phase rectifier circuit and storage capacitor is configured between the main power supply and $V_{IN}$. In another embodiment, a 3-phase power-factor correction circuit is configured between the main power supply and $V_{IN}$.

In one embodiment, the primary full-bridge inverter 310 accepts the main power supply at input $V_{IN}$ and produces the magnetic flux 160 in a primary inductor T1. Magnetic flux is generated when there is a voltage across the inductor T1. The magnetic flux 160 induces an AC voltage and current that is associated with a secondary inductor T2 and received by the rectifier circuit 145. In one embodiment, the secondary full-bridge rectifier 320 produces an output voltage level $V_{OUT}$ of 1 VDC and an output current $I_{OUT}$ of 75 A in response to the magnetic flux 160. The inductor L1 and the capacitor C1 are a filter circuit that smooths the induced voltage to produce a steady $V_{OUT}$. $V_{OUT}$ is the second voltage level and $I_{OUT}$ is the second current that is generated based on the induced voltage and current, respectively. The transformer (i.e., T1 and T2) is split with the secondary core of the secondary inductor T2 being integrated into the integrated circuit module 155 and the primary core of the primary inductor T1 being implemented on a high voltage module that is physically coupled to the secondary core.

The primary full-bridge inverter 310 drives the primary winding 230 using four high-voltage (e.g., up to 600 Volts or more) power metal-oxide semiconductor field-effect transistors (MOSFETs) M1, M2, M3, and M4. The transistors are driven in a sequence with transistors M2 and M4 enabled to apply a first voltage level, $V_{IN}$, (e.g., +480 Volts) across the primary winding 230, then transistors M2 and M4 are disabled and transistors M1 and M4 are enabled to free-wheel the first current through the primary winding 230 with zero Volts across the primary winding 230. Then transistor M4 is disabled and transistor M3 is enabled (with M1 still enabled) to apply the first voltage level in the opposite direction (e.g., −480 Volts) across the primary winding 230. Finally, transistors M1 and M3 are disabled and transistors M2 and M3 are enabled to free-wheel the first current through the primary winding 230 in the other direction. The first current alternates directions through the primary winding 230 and produces the magnetic flux 160 in the magnetic core. In one embodiment the transformer formed by T1 and T2 has a turns ratio of 240:1, 240 turns on the primary winding 230 and 1 turn on the secondary winding 215. Thus, when a first AC voltage of +/−480 Volts is applied to the primary winding 230, as induced voltage of +/−2 Volts appears across the secondary winding 215.

The switching events of enabling and disabling pairs of transistors in the primary full-bridge inverter 310 may be timed so that one pair of transistors is disabled and switches off before another pair of transistors is enabled and switches on. A dead-time when only one transistor is enabled or no transistors are enabled allows the first current to charge or discharge a switching node so the next enabling transition occurs with zero voltage across the transistors that are enabled. For example on the transition from M2 and M4 to M1 and M4, M2 is disabled before M1 is enabled. The drain of M1 is discharged, allowing M1 to switch on with zero voltage across M1 when M1 is enabled. Switching with zero voltage across a transistor reduces power losses due to switching.

The induced voltage is rectified by a secondary full-bridge rectifier 320 that includes the transistors M5, M6, M7, and M8. In one embodiment, the transistors M5, M6, M7, and M8 are low-voltage planar MOSFETs. Therefore, the transistors M5, M6, M7, and M8 may be integrated onto the integrated circuit die 150 with the integrated circuit 300.

When transistors M2 and M4 of the primary full-bridge inverter 310 of the primary full-bridge inverter 310 are enabled, transistors M6 and M8 are enabled (and transistors M5 and M7 are disabled) to apply the induced voltage level (e.g., +2 Volts) to an inductor L1. Similarly when the transistors M1 and M3 are enabled, transistors M5 and M7 are enabled (and transistors M6 and M8 are disabled) to also apply the induced voltage level (e.g., +2 Volts) to the inductor L1. Note, that although the polarity of the voltage at T2 alternates, the voltage at L1 is positive due to the signals controlling the transistors M5, M6, M7, and M8.

Whenever either transistors M1 and M4 are enabled or transistors M2 and M3 are enabled, all four of the transistors M5, M6, M7, and M8 are enabled to provide a low-impedance path around a loop through L1 and a filter capacitor C1 while the transformer is shorted.

The output voltage of the secondary full-bridge rectifier 320, is controlled by regulating widths of alternating polarity pulses of the first voltage level (e.g., +/−480 Volt pulses) generated by controlling transistors M1, M2, M3, and M4, to alternate the polarity across T1. The second current, $I_{OUT}$ is provided to the integrated circuit 300. A controller may be included as part of the primary full-bridge inverter 310. Signals are transmitted to the controller from the integrated circuit module 155 to sense $V_{OUT}$ across the capacitor C1 and signals are transmitted from the controller to the integrated circuit module 155 to synchronize the drive signals that enable and disable the transistors M5, M6, M7, and M8.

If isolation is not required between T1 and T2, a common ground supply may be shared between the primary full-bridge inverter 310 and the secondary full-bridge rectifier 320. In one embodiment, a controller unit configured to generate the control signals for the transistors resides in the primary side of the system and that are control signals are transmitted between the primary full-bridge inverter 310 and the secondary full-bridge rectifier 320 may be routed via a low-voltage connector. If isolation is required between T1 and T2, the control signals transmitted between the secondary full-bridge rectifier 320 and the primary full-bridge inverter 310 may be coupled either optically or magnetically. When T1 and T2 are isolated, the low power supplies (e.g., ground) of secondary full-bridge rectifier 320 and the primary full-bridge inverter 310 may be at different voltage levels.

Figure 3B:
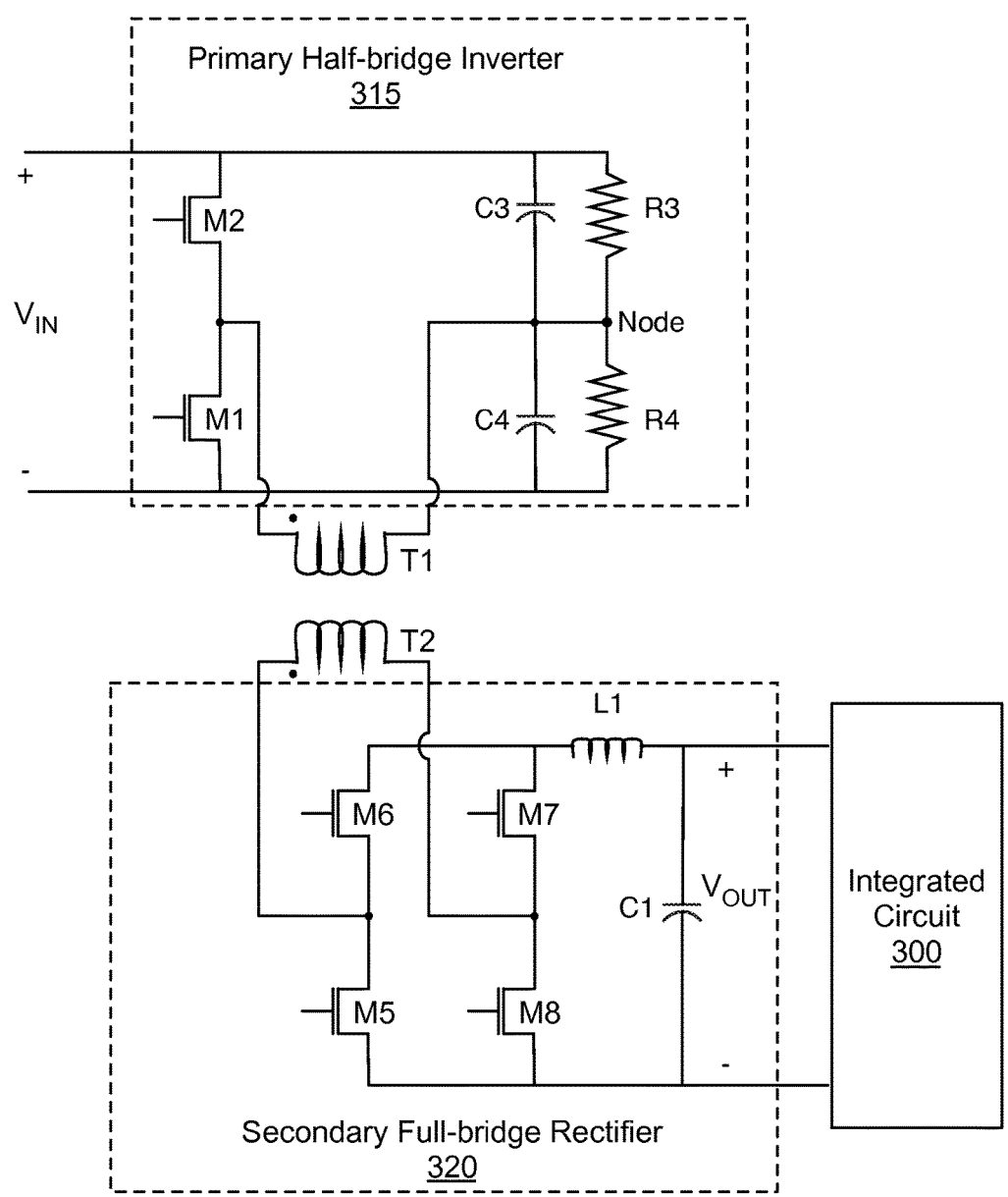
FIG. 3B illustrates a primary half-bridge inverter and secondary full-bridge rectifier configured as a magnetic power supply coupling system, in accordance with one embodiment.

FIG. 3B illustrates a primary half-bridge inverter 315 and the secondary full-bridge rectifier 320 that are configured as a magnetic power supply coupling system, in accordance with one embodiment. Two primary half-bridge inverters 315 may be included in the magnetic flux source 135 shown in FIG. 1B where each primary half-bridge inverter 315 and transformer is one of two synchronized phases used to produce the alternating current and the AC voltage at the primary winding 135. In the primary half-bridge inverter 315 a capacitor C3 and resistor R3 are configured in parallel with each other and replace the transistor M3 in the primary full-bridge inverter 310. Similarly, a capacitor C4 and resistor R4 are configured in parallel with each other and replace the transistor M4 in the primary full-bridge inverter 310. The voltage at the node between resistors R3 and R4 is maintained at approximately half the voltage level of $V_{IN}$.

The transistors are driven in a sequence with transistor M2 enabled to apply a first voltage level, $V_{IN}/2$, (e.g., +240 Volts) to the node between R3 and R4. The AC voltage across the primary winding 230 is $V_{IN}-V_{IN}/2$. Then, transistor M2 is disabled to free-wheel the first current through the primary winding 230 and the voltage across the primary winding 230 drops to zero Volts as the magnetic field dissipates and current is induced in T2. Then transistor M1 is enabled to apply the first voltage level, $V_{IN}/2$−GND, in the opposite direction (e.g., −240 Volts) across the primary winding 230. Finally, transistor M1 is disabled to free-wheel the first current through the primary winding 230 in the other direction. The first current alternates directions through the primary winding 230 and produces the magnetic flux 160 in the magnetic core and an induced voltage appears across the secondary winding 215.

Figure 3C:
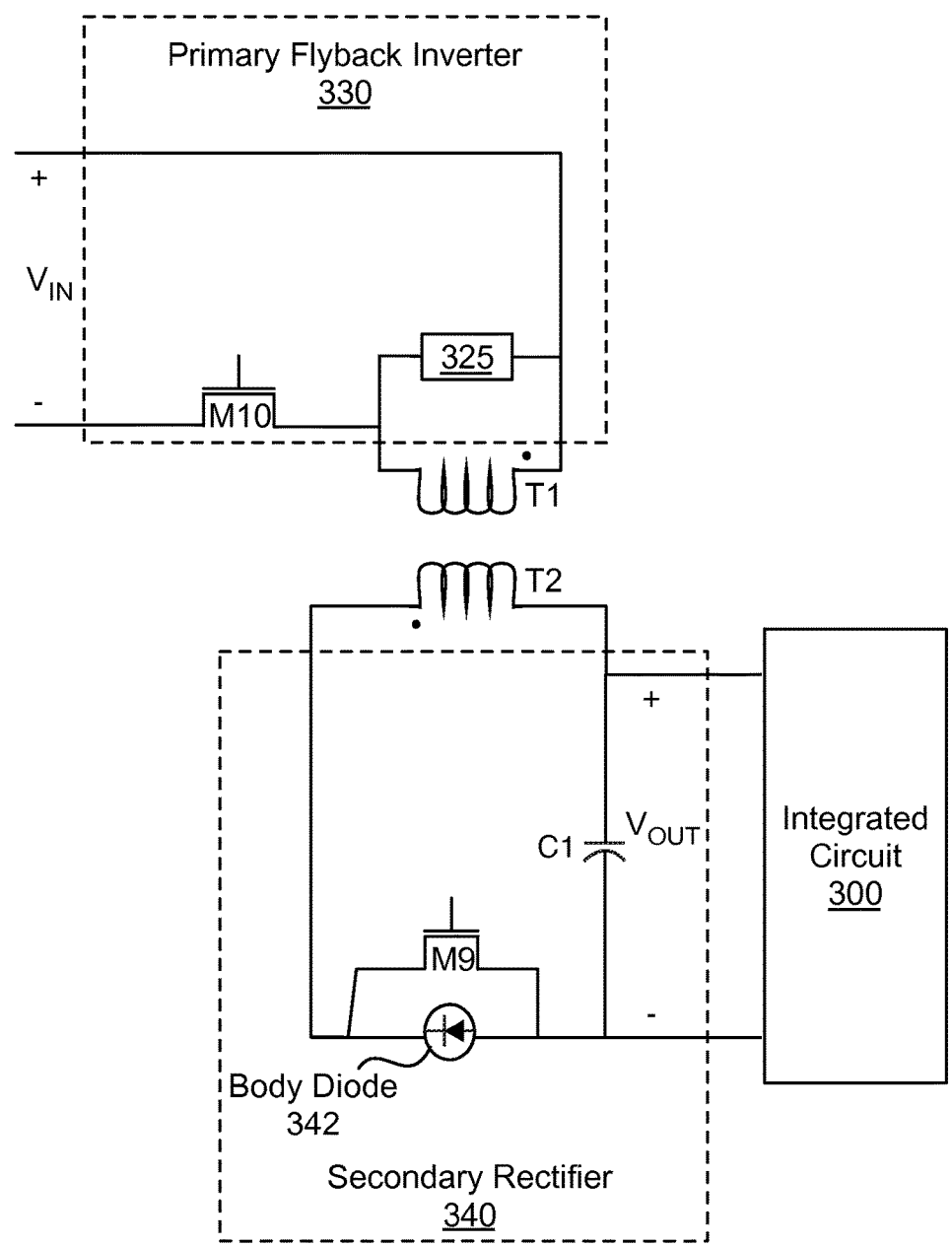
FIG. 3C illustrates a primary flyback converter and secondary rectifier configured as a magnetic power supply coupling system, in accordance with another embodiment.

FIG. 3C illustrates a primary flyback inverter 330 and secondary rectifier 340 that is configured as a magnetic power supply coupling system, in accordance with another embodiment. In the primary flyback inverter 330, the transistors M1, M2, M3, and M4 that are included in the primary full-bridge inverter 310 are replaced with a transistor M10 and a dissipative element 325 (i.e., a snubber). In one embodiment, the transistor M10 is a power MOSFET. The transistor M10 is enabled to charge the magnetizing inductance of the primary inductor T1. Then the transistor M10 is disabled and the magnetic flux stored in T1 is discharged through the secondary inductor T2 when transistor M10 is disabled, inducing a current through T2 and a voltage across T2. When M10 is disabled, energy stored in the leakage inductance of the transformer is dissipated by the dissipative element 325.

Compared with the secondary full-bridge rectifier 320, the inductor L1 is omitted from the secondary rectifier 340 and the transistors M5, M6, M7, and M8 are replaced with a transistor M9. Transistor M9 is enabled when transistor M10 is disabled and transistor M9 is disabled when transistor M10 is enabled. A body diode 342 that is inherent to the transistor M9 indicates a direction of the current that is induced by the magnetic flux 160. The inductor L1 may be omitted from the secondary rectifier 340 because the magnetizing inductance of the transformer functions as a storage inductor.

Figure 3D:
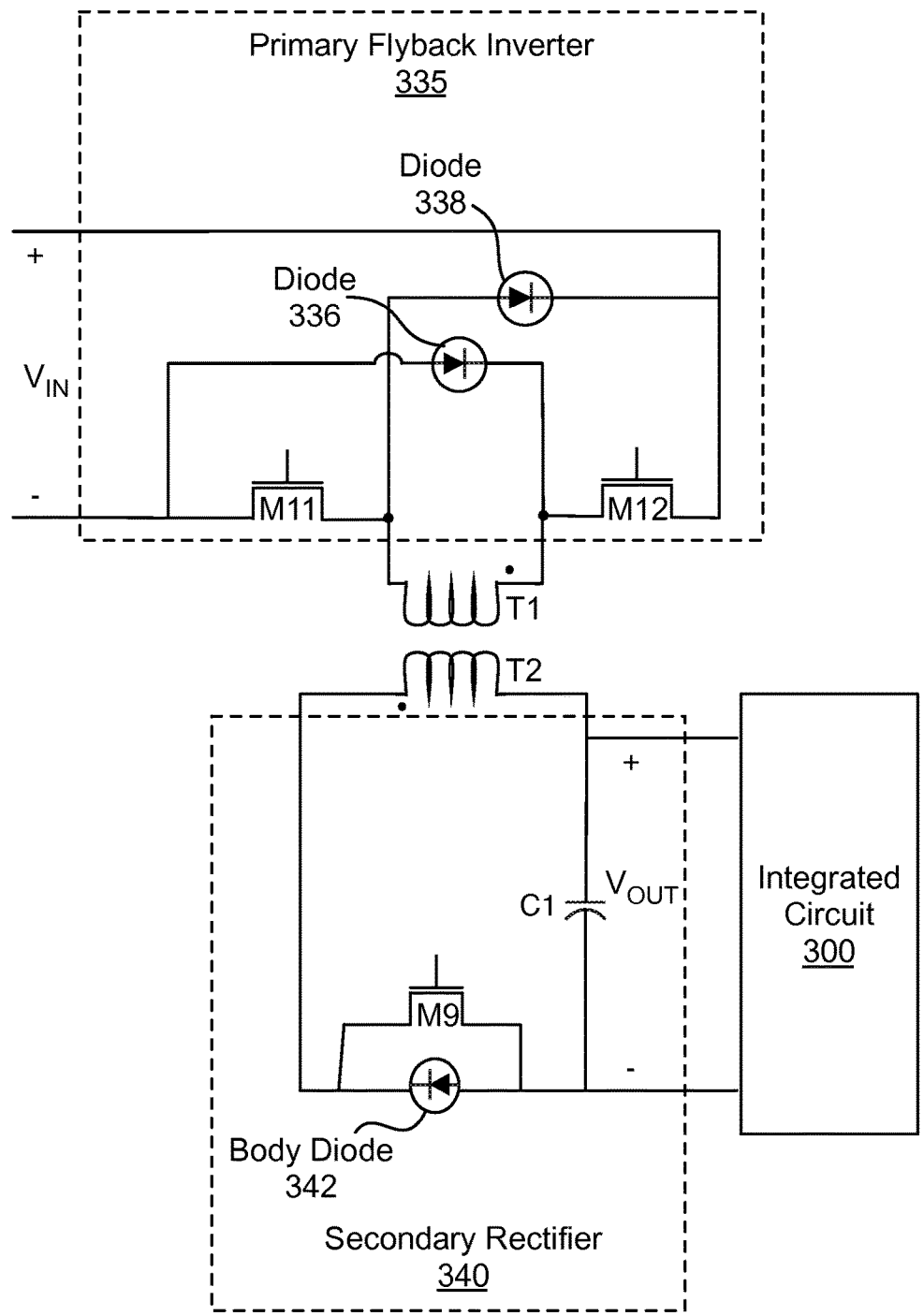
FIG. 3D illustrates a primary flyback converter and another secondary rectifier configured as a magnetic power supply coupling system, in accordance with another embodiment.

FIG. 3D illustrates a primary flyback converter 335 and the secondary rectifier 340 that are configured as a magnetic power supply coupling system, in accordance with another embodiment. In the primary flyback converter 335, the transistors M1, M2, M3, and M4 that are included in the primary full-bridge inverter 310 are replaced with transistors M11 and M12 and diodes 336 and 338. In one embodiment, the transistors M11 and M12 are power MOSFETs. The transistors M11 and M12 are enabled to charge the primary inductor T1. Then the transistors M11 and M12 are disabled. Current flowing through T1 generates a magnetic field corresponding to the magnetic flux 160. The magnetic flux that develops when M11 and M12 are enabled is discharged through the secondary inductor T2 when transistors M11 and M12 are disabled, varying the voltage across T1 and inducing a current through T2 and a voltage across T2.

Transistor M9 in the secondary rectifier 340 is enabled when transistors M11 and M12 are disabled and M9 is disabled when transistors M11 and M12 are enabled. When transistors M11 and M12 are disabled the leakage inductance is removed from the primary inductor T1 by diodes 336 and 338. The diodes 336 and 338 are configured to return the energy stored in the leakage inductance of the transformer to the power supply. In another embodiment, the primary flyback inverter 335 is replaced with a forward inverter circuit.

Figure 4A:
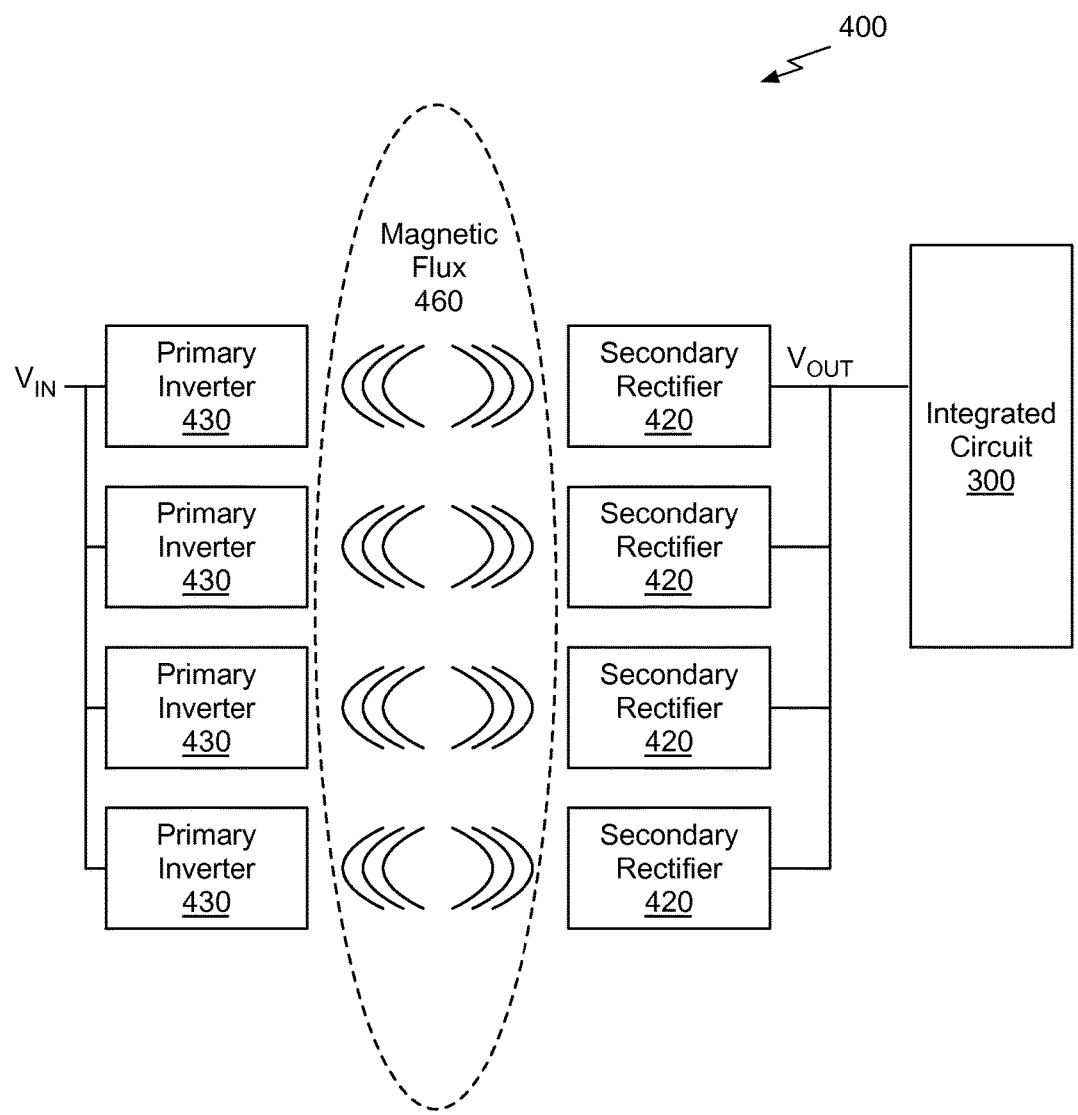
FIG. 4A illustrates a multiple phase magnetic power supply coupling system, in accordance with another embodiment.

A multiple-phase magnetic power supply coupling system may be implemented by using multiple inverter and rectifier pairs and corresponding transformers. FIG. 4A illustrates a multiple phase magnetic power supply coupling system 400, in accordance with another embodiment. The transformer corresponding to each primary inverter 430 and secondary rectifier 420 operates during one of four different phases to provide the second voltage and the second current to the integrated circuit 300. In one embodiment, each phase is driven in an interleaved manner to minimize ripple in $V_{in}$. Note that multiple phases can use a common 'return leg' of the transformer as long as each phase has its own 'input' leg to ensure that the magnetic flux from one phase is isolated from the windings of the other phases.

The four primary inverters 430 generate a magnetic flux 460 that induces a current and a voltage in a respective secondary rectifier 420 during one of the four phases. The primary inverters 430 and the secondary rectifiers 420 may each be implemented as the primary full-bridge inverter 310 and the secondary full-bridge rectifier 320, the primary half-bridge inverter 315 and the secondary full-bridge rectifier 320, the primary flyback inverter 330 and the secondary rectifier 340, and the primary flyback inverter 335 and the secondary rectifier 340.

Figure 4B:
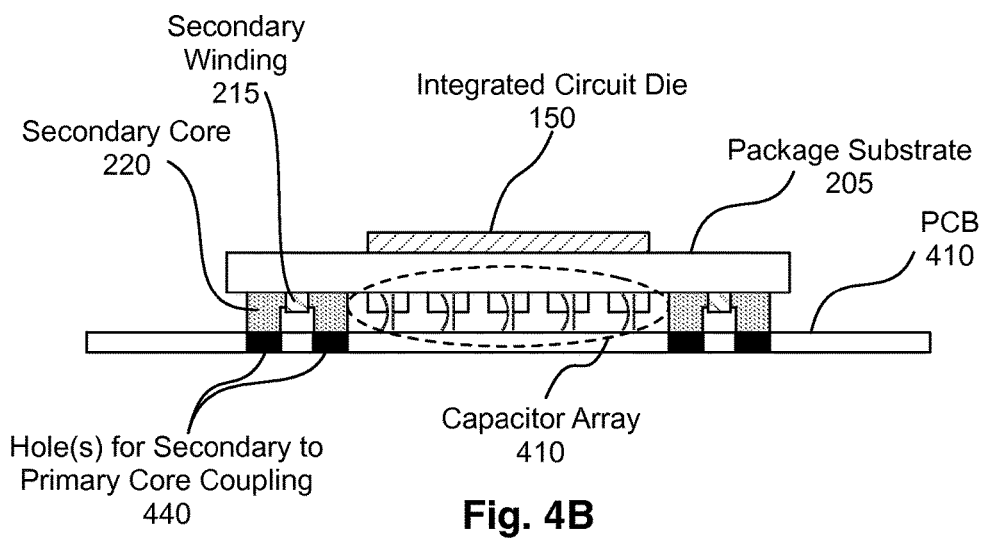
FIG. 4B, illustrates a cross-section view of the magnetic power supply coupling system of FIG. 1B, in accordance with one embodiment.

FIG. 4B illustrates a cross-section view of the magnetic power supply coupling system of FIG. 1B, in accordance with one embodiment. The filter capacitor C1 that is included in the rectifier circuit 145 (shown in FIGS. 3A-3D) may be implemented as an array of capacitors 410 where the capacitors are coupled in parallel and located on the package substrate 205. The array of capacitors 410 is located on the opposite side of the package substrate 205 compared with the integrated circuit die 150. The integrated circuit module 155 shown in FIG. 1B may include the integrated circuit die 150, the package substrate 205, the capacitor array 410, the secondary winding 215, and at least a portion of the secondary core 220. The integrated circuit module 155 is electrically coupled to a PCB 410. The PCB 410 may replace the PCB 210 shown in FIGS. 2A-2C and the PCB 260 shown in FIGS. 2D-2F.

Figure 4C:
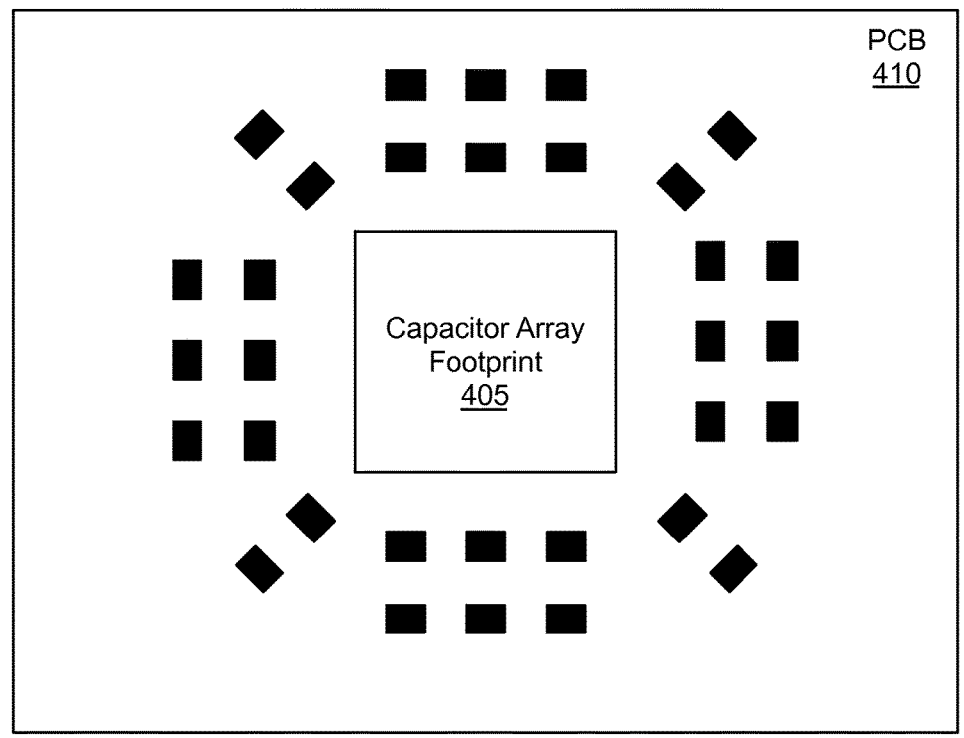
FIG. 4C illustrates the unpopulated PCB 410 of FIG. 4B, in accordance with one embodiment.

FIG. 4C illustrates the unpopulated PCB 410 of FIG. 4B, in accordance with one embodiment. The area occupied by the array of capacitors 410 that is on the PCB 410 below the package substrate 205 is a capacitor array footprint 405. The PCB 410 may include a single or pair of holes for coupling the secondary core 220 to the primary core 225 for each small transformer, where a set of the small transformers forms each transformer for one phase of multiple phases. In one embodiment, a portion (e.g., a pair) of the set of transformers may implement a phase of the magnetic power supply coupling system 400 shown in FIG. 4A.

Figure 4D:
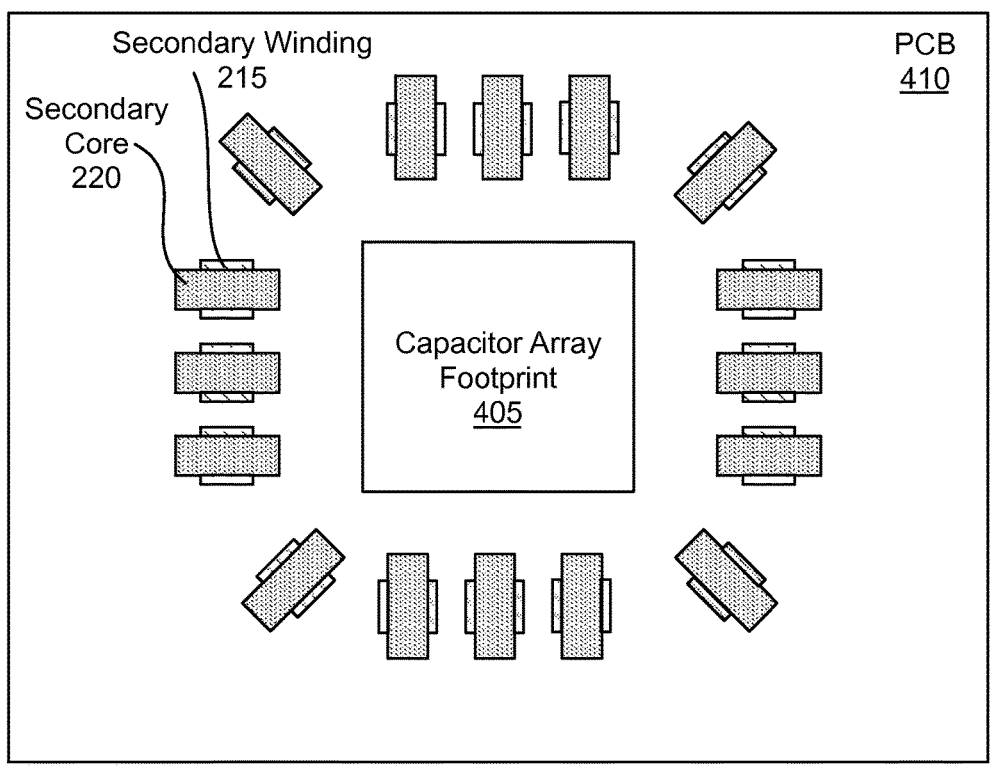
FIG. 4D illustrates a cross-section view of the PCB of FIG. 4B, in accordance with one embodiment.

FIG. 4D illustrates a cross-section view of the PCB 410 of FIG. 4B, in accordance with one embodiment. The cross-section view is at a plane cutting through the secondary cores 220 where the secondary windings 215 are electrically coupled to the package substrate 205. The secondary core 220 of each small transformer is coupled to a respective primary core 225 that is located on the underside of the PCB 410. A portion of the set of transformers may implement a phase of the magnetic power supply coupling system 400 shown in FIG. 4A.

Figure 5:
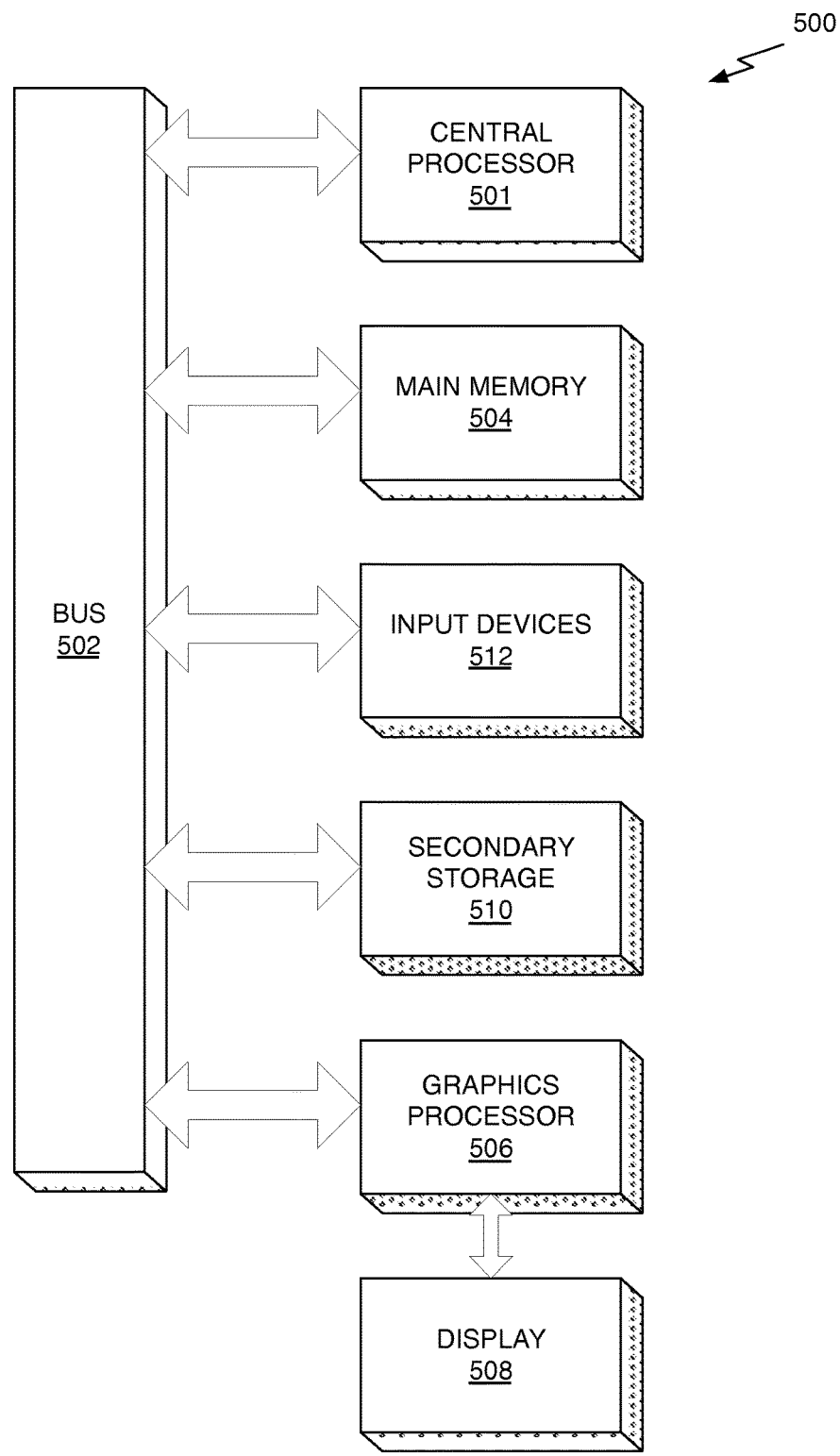
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 504 and/or the secondary storage 510. Such computer programs, when executed, enable the system 500 to perform various functions. The memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   providing a magnetic core comprising a first portion and a second portion;
   providing an integrated circuit module including a package substrate, an integrated circuit die mounted on the package substrate, and a secondary winding that is configured to generate an induced, alternating current based on a magnetic flux, wherein a secondary inductor comprises the second portion of a magnetic core and the secondary winding;

providing a primary winding, proximate to the integrated circuit module and coupled to a main power supply corresponding to an alternating current that generates the magnetic flux, wherein a primary inductor comprises the first portion of the magnetic core and the primary winding; and converting the induced, alternating current into a direct current at a voltage level to supply power to the integrated circuit die, wherein a circumference of the first portion of the magnetic core increases as a distance from the package substrate increases.

2. The method of claim 1, wherein the voltage level is lower than a voltage level of the main power supply.

3. The method of claim 1, further comprising providing a full-bridge inverter circuit that is coupled to the primary winding and configured to generate the alternating current that generates the magnetic flux.

4. The method of claim 1, wherein the primary winding comprises a trace fabricated as part of a printed circuit board.

5. The method of claim 1, wherein the first portion of the magnetic core is physically coupled to the second portion of the magnetic core through openings in a printed circuit board.

6. The method of claim 1, wherein the secondary winding comprises a piece of conductive tape over the second portion of the magnetic core.

7. The method of claim 1, wherein the second portion of the magnetic core is at least partially recessed into the package substrate.

8. The method of claim 1, wherein a rectifier circuit that is coupled to the secondary winding is configured to convert the induced, alternating current into the direct current at the voltage level to supply power to the integrated circuit die.

9. A method of claim 1, comprising:
providing a magnetic core comprising a first portion and a second portion, wherein a circumference of the second portion of the magnetic core varies along a length of the second portion of the magnetic core;
providing an integrated circuit module including an integrated circuit die and a secondary winding that is configured to generate an induced, alternating current based on a magnetic flux, wherein a secondary inductor comprises the second portion of the magnetic core and the secondary winding;
providing a primary winding, proximate to the integrated circuit module and coupled to a main power supply corresponding to an alternating current that generates the magnetic flux, wherein a primary inductor comprises the first portion of the magnetic core and the primary winding; and
converting the induced, alternating current into a direct current at a voltage level to supply power to the integrated circuit die.

10. The method of claim 9, wherein the circumference of the second portion of the magnetic core is smallest within the secondary winding.

11. The method of claim 9, wherein the voltage level is lower than a voltage level of the main power supply.

12. A magnetic power supply coupling system, comprising:

a magnetic core comprising a first portion and a second portion;
an integrated circuit module comprising:
a package substrate;
an integrated circuit die mounted on the package substrate; and
a secondary winding that is configured to generate an induced, alternating current based on a magnetic flux, wherein the induced, alternating current is converted into a direct current at a voltage level to supply power to the integrated circuit die, wherein a secondary inductor comprises the second portion of the magnetic core and the secondary winding; and
a primary winding, proximate to the integrated circuit module and coupled to a main power supply corresponding to an alternating current that generates the magnetic flux, wherein a primary inductor comprises the first portion of the magnetic core and the primary winding,
wherein a circumference of the first portion of the magnetic core increases as a distance from the package substrate increases.

13. The magnetic power supply coupling system of claim 12, further comprising a rectifier circuit that is coupled to the secondary winding and configured to convert the induced, alternating current into the direct current at the voltage level.

14. The magnetic power supply coupling system of claim 12, wherein the voltage level is lower than a voltage level of the main power supply.

15. The magnetic power supply coupling system of claim 12, further comprising a full-bridge inverter circuit that is coupled to the primary winding and configured to generate the alternating current that generates the magnetic flux.

16. An apparatus comprising:
a magnetic core comprising a first portion and a second portion;
a primary winding, wherein a primary inductor comprises the first portion of the magnetic core and the primary winding;
an integrated circuit module, the integrated circuit module comprising:
a package substrate;
an integrated circuit die mounted on the package substrate; and
a secondary winding that is configured to generate an induced, alternating current based on a magnetic flux, wherein the magnetic flux is generated by the primary winding that is proximate to the integrated circuit module and coupled to a main power supply corresponding to an alternating current wherein a secondary inductor comprises the second portion of the magnetic core and the secondary winding; and
a rectifier circuit that is configured to convert the induced, alternating current into a direct current at a voltage level to supply power to the integrated circuit die,
wherein a circumference of the first portion of the magnetic core increases as a distance from the package substrate increases.

17. The integrated circuit module of claim 16, wherein the voltage level is lower than a voltage level of the main power supply.

18. A magnetic power supply coupling system, comprising:
a magnetic core comprising a first portion and a second portion, wherein a circumference of the second portion of the magnetic core varies along a length of the second portion of the magnetic core;

an integrated circuit module comprising:
  an integrated circuit die; and
  a secondary winding that is configured to generate an induced, alternating current based on a magnetic flux, wherein the induced, alternating current is converted into a direct current at a voltage level to supply power to the integrated circuit die, wherein a secondary inductor comprises the second portion of the magnetic core and the secondary winding; and
a primary winding, proximate to the integrated circuit module and coupled to a main power supply corresponding to an alternating current that generates the magnetic flux, wherein a primary inductor comprises the first portion of the magnetic core and the primary winding.

19. An apparatus comprising:
a magnetic core comprising a first portion and a second portion, wherein a circumference of the second portion of the magnetic core varies along a length of the second portion of the magnetic core;
a primary winding, wherein a primary inductor comprises the first portion of the magnetic core and the primary winding;
an integrated circuit module, the integrated circuit module comprising:
  an integrated circuit;
  a secondary winding that is configured to generate an induced, alternating current based on a magnetic flux, wherein the magnetic flux is generated by the primary winding that is proximate to the integrated circuit module and coupled to a main power supply corresponding to an alternating current, wherein a secondary inductor and the secondary winding comprise the second portion of the magnetic core; and
a rectifier circuit that is configured to convert the induced, alternating current into a direct current at a voltage level to supply power to the integrated circuit die.

\* \* \* \* \*

UNITED STATES PATENT AND TRADEMARK OFFICE
CERTIFICATE OF CORRECTION

Page 1 of 1

PATENT NO. : 10,361,023 B2
APPLICATION NO. : 14/815853
DATED : July 23, 2019
INVENTOR(S) : Dally et al.

It is certified that error appears in the above-identified patent and that said Letters Patent is hereby corrected as shown below:

Column 1 Line 11 Please add the following paragraph after the Claim of Priority paragraph:
-- STATEMENT REGARDING FEDERALLY SPONSORED RESEARCH AND DEVELOPMENT
This invention was made with US Government support under LLNS subcontract B599861 awarded by DOE. The US Government has certain rights in this invention. --

Signed and Sealed this
Fourteenth Day of July, 2020

Andrei Iancu
*Director of the United States Patent and Trademark Office*